US006892263B1

(12) United States Patent
Robertson

(10) Patent No.: US 6,892,263 B1
(45) Date of Patent: May 10, 2005

(54) SYSTEM AND METHOD FOR HOT SWAPPING DAUGHTERCARDS IN HIGH AVAILABILITY COMPUTER SYSTEMS

(75) Inventor: William L. Robertson, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 577 days.

(21) Appl. No.: 09/680,244

(22) Filed: Oct. 5, 2000

(51) Int. Cl.$^7$ .............................................. G06F 13/00
(52) U.S. Cl. ........................ 710/301; 710/302; 710/304; 710/300; 710/104
(58) Field of Search ................................ 710/301–304, 710/104, 300; 361/686

(56) References Cited

U.S. PATENT DOCUMENTS

| | | | |
|---|---|---|---|
| 5,155,834 A | * 10/1992 | Ryan et al. ................. | 711/205 |
| 5,568,619 A | 10/1996 | Blackledge et al. | |
| 5,640,570 A | 6/1997 | St. Clair et al. | |
| 5,815,647 A | 9/1998 | Buckland et al. | |
| 5,922,060 A | * 7/1999 | Goodrum .................... | 710/302 |
| 5,991,900 A | * 11/1999 | Garnett ....................... | 714/56 |
| 6,047,343 A | * 4/2000 | Olarig ......................... | 710/302 |
| 6,076,160 A | * 6/2000 | Wisor ........................... | 713/1 |
| 6,088,785 A | 7/2000 | Hudson et al. | |
| 6,178,469 B1 | 1/2001 | Hennessy et al. | |
| 6,381,662 B1 | * 4/2002 | Harari et al. ............... | 710/301 |
| 6,418,492 B1 | * 7/2002 | Papa et al. .................. | 710/302 |
| 6,446,148 B1 | * 9/2002 | Goodfellow .................. | 710/2 |
| 6,505,258 B1 | * 1/2003 | Sakarda et al. ............. | 710/18 |
| 6,542,995 B2 | * 4/2003 | Heinrich et al. ............ | 713/202 |
| 6,573,620 B1 | * 6/2003 | Craig et al. ................. | 307/147 |
| 2003/0204342 A1 | * 10/2003 | Law et al. .................... | 702/65 |

OTHER PUBLICATIONS

"CompactPCI™ Specification Short Form, PCIMG 2.0 R2.1," PCI Industrial Computers Manufacturers group, Sep. 2, 1997.
International search report application no. PCT/US 01/42211, mailed Apr. 5, 2002.

* cited by examiner

*Primary Examiner*—Tim Vo
*Assistant Examiner*—Kim T. Huynh
(74) *Attorney, Agent, or Firm*—Meyertons Hood Kivlin Kowert & Goetzel, P.C.; B. Noël Kivlin

(57) ABSTRACT

A system and method for hot swapping daughtercards in high availability computer systems. In one embodiment, a high availability computer system includes a peripheral bus. Daughtercards may be added to the computer system by inserting them into connectors associated with the peripheral bus. The daughtercards are configured to allow their insertion or removal from the computer system without interruption to system operations. When inserted into a computer system, a daughtercard may be powered up by power control circuitry on the daughtercard. When the daughtercard is powered up, it may then assert a configuration change signal. The computer system may then respond to the assertion of the configuration change signal by establishing software communications with the daughtercard. The configuration change signal may be driven to a storage unit located within a bus interface unit of the computer system. The state of the configuration change signal may be stored within a storage location of the storage unit. The storage location in which the state of a configuration change signal is stored for a given daughtercard is exclusive to that daughtercard. Thus, when a computer system detects the assertion of a configuration change signal, it may immediately make a determination as to which daughtercard asserted the signal.

46 Claims, 6 Drawing Sheets

SYSTEM AND METHOD FOR HOT SWAPPING DAUGHTERCARDS IN HIGH AVAILABILITY COMPUTER SYSTEMS

BACKGROUND OF THE INVENTION

1. Field of the Invention

This invention relates to computer hardware, and more particularly, to daughtercards which may be added to a computer system with no interruption to system operation.

2. Description of the Relevant Art

Computer systems that must operate for long periods of time without interruption are sometimes referred to as high availability computer systems. Many high availability computer systems are also configured to continue operation despite some system component failures. Examples of high availability computer systems may include industrial computers or network file servers. In addition to the core elements of the computer system, such as the processor and memory, many high availability computer systems also include additional hardware. Such hardware may include network interface cards, process controllers, or cards providing other types of functionality. At times, it may be necessary to add or remove hardware (i.e. daughtercards) in a high availability computer system. In many cases, the computer system must continue uninterrupted operation despite this need. To this end, various standards have been developed that allow hardware to be added or removed from a computer system with no interruption to system operation (often referred to as "hot swapping"). One such standard is the CompactPCI® Hotswap Specification. This standard provides guidelines for designing daughtercards which may be inserted into an operating computer system without removing power or interrupting operations, as well as providing procedures for initiating software communications with the daughtercard. The standard also provides guidelines for terminating software communications between the daughtercard and computer system, as well as removing the daughtercard without interrupting operations.

A first requirement for any computer system to support hot swapping is to provide circuitry that enables the safe, orderly power-up of a daughtercard upon insertion, and orderly power-down upon preparation for removal. Daughtercards configured for hot swapping typically include power circuitry which isolates the functional circuitry (i.e. that circuitry which enables the daughtercard to perform its intended function) from system power. After detection of system power, the power circuitry may then allow power to be provided to the entire daughtercard. Some power circuitry may also be configured to control the sequence at which certain devices on the daughtercard receive power. Similarly, prior to removing a daughtercard from an operating computer system, power circuitry may remove power from the daughtercard in a controlled fashion.

A second requirement to support hot swapping is the establishment of software communications between the host computer system and the daughtercard. Software communications may be established manually through the intervention of a user of the computer system, or automatically. In the CompactPCI® Hotswap Specification, software communications may automatically be initiated following the power-up sequence by the assertion of a signal referred to as ENUM#. The ENUM# signal is bussed within a host computer system, as several daughtercards may share a common signal line. When a host computer system detects that a daughtercard has asserted the ENUM# signal, it may then begin polling the various daughtercards in order to determine which one asserted the signal. Once the host computer system determines the source of the asserted ENUM# signal, it may then begin to initiate software contact with the appropriate daughtercard.

The ENUM# signal may also be used to terminate software communications between a daughtercard and the host computer system. Daughtercards that conform to the CompactPCI® Hotswap Specification include an ejector handle for removing the daughtercard from the computer system. This ejector handle may activate a switch on the daughtercard, which may in turn assert the ENUM# signal. After determining the source of the asserted ENUM# signal, the host computer system may then begin the process of terminating software communications with the appropriate daughtercard. Once software communications have been terminated, the daughtercard may then begin its power-off sequence. When the power-off sequence is complete, the daughtercard may then be physically extracted from the computer system. Daughtercards which conform to the CompactPCI® Hotswap Specification include light-emitting diode (LED) which, when illuminated, indicate that it is safe to extract the board from the computer system.

One problem that arises with systems such as that described above pertains to the use of bussed signals. As previously stated, the ENUM# signal of the CompactPCI® Hotswap Specification is a bussed signal. This is illustrated in FIG. 1. Within the host computer system, the signal path for the ENUM# signal is common to each daughtercard slot (i.e. connector). Thus, when the ENUM# signal is asserted, the host computer system must first determine from which slot a daughtercard has asserted the signal. This may require polling each of the daughtercards in order to make this determination. Such polling may add complexity to system software routines for controlling the hotswap process. Furthermore, the computer may be required to use several bus cycles in order to determine which daughtercard asserted the signal. The use of the extra bus cycles may have an adverse affect on system performance.

SUMMARY OF THE INVENTION

The problems outlined above may in large part be solved by a system and method for hot swapping daughtercards in high availability computer systems in accordance with the present invention. In one embodiment, a high availability computer system includes a peripheral bus. Daughtercards may be added to the computer system by inserting them into connectors associated with the peripheral bus. The daughtercards are configured to allow their insertion or removal from the computer system without interruption to system operations. When inserted into a computer system, a daughtercard may be powered up by power control circuitry on the daughtercard. When the daughtercard is powered up, it may then assert a configuration change signal (such as the ENUM# signal described above). The computer system may then respond to the assertion of the configuration change signal by establishing software communications with the daughtercard. The configuration change signal may be driven to a storage unit located within a bus interface unit of the computer system. The state of the configuration change signal may be stored within a storage location of the storage unit. The storage location in which the state of a configuration change signal is stored for a given daughtercard is exclusive to that daughtercard. Thus, when a computer system detects the assertion of a configuration change signal, it may immediately make a determination as to which daughtercard asserted the signal.

In one embodiment, removal of the daughtercard from the computer system may begin with the assertion of the configuration change signal. The configuration change signal may be asserted in response to the actuation of a switch mounted to the daughtercard. The switch may be actuated by an ejector handle attached to the daughtercard. When the computer system detects the assertion of the configuration change signal, it may then begin the termination of software communications with the daughtercard. In some cases, software communications may terminate immediately, while in others, a given task involving the daughtercard may be allowed to complete before terminating communications. When software communications have been terminated, power control circuitry may begin to remove power from the daughtercard. Following the removal of power from the daughtercard, a light-emitting diode (LED) on the daughtercard may then be illuminated. When illuminated, the LED indicates to a user of the computer system that it is safe to extract the daughtercard.

Thus, in various embodiments, the system and method for hot swapping daughtercards in high availability computer systems may allow the addition or removal of peripheral hardware with no interruption to system operation. The use of a separate storage location for storing the state of a configuration change signal for each daughtercard may allow for the simplification of system software. Instead of polling, the use of separate storage locations may allow the computer system to immediately determine which daughtercard asserted the configuration change signal. Thus, associated polling routines may be eliminated, thereby simplifying system software.

BRIEF DESCRIPTION OF THE DRAWINGS

Other objects and advantages of the invention will become apparent upon reading the following detailed description and upon reference to the accompanying drawings in which.

Figure 1:
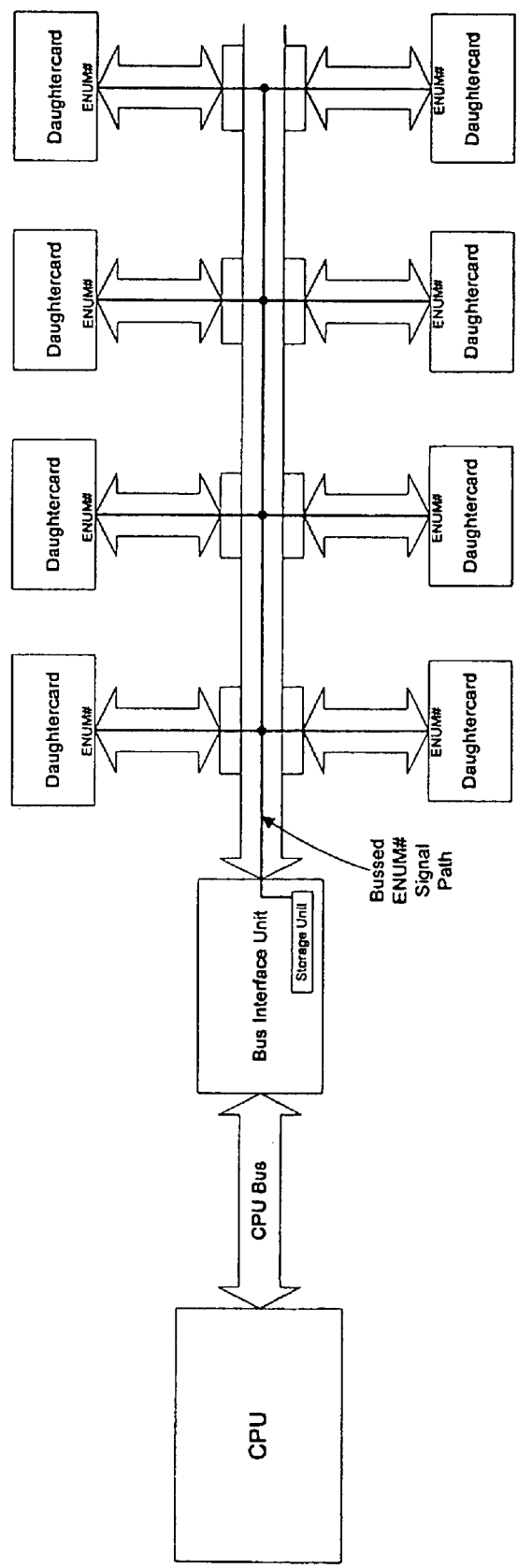
FIG. 1 (prior art) is a block diagram of a computer system with a bussed ENUM# signal.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Figure 2:
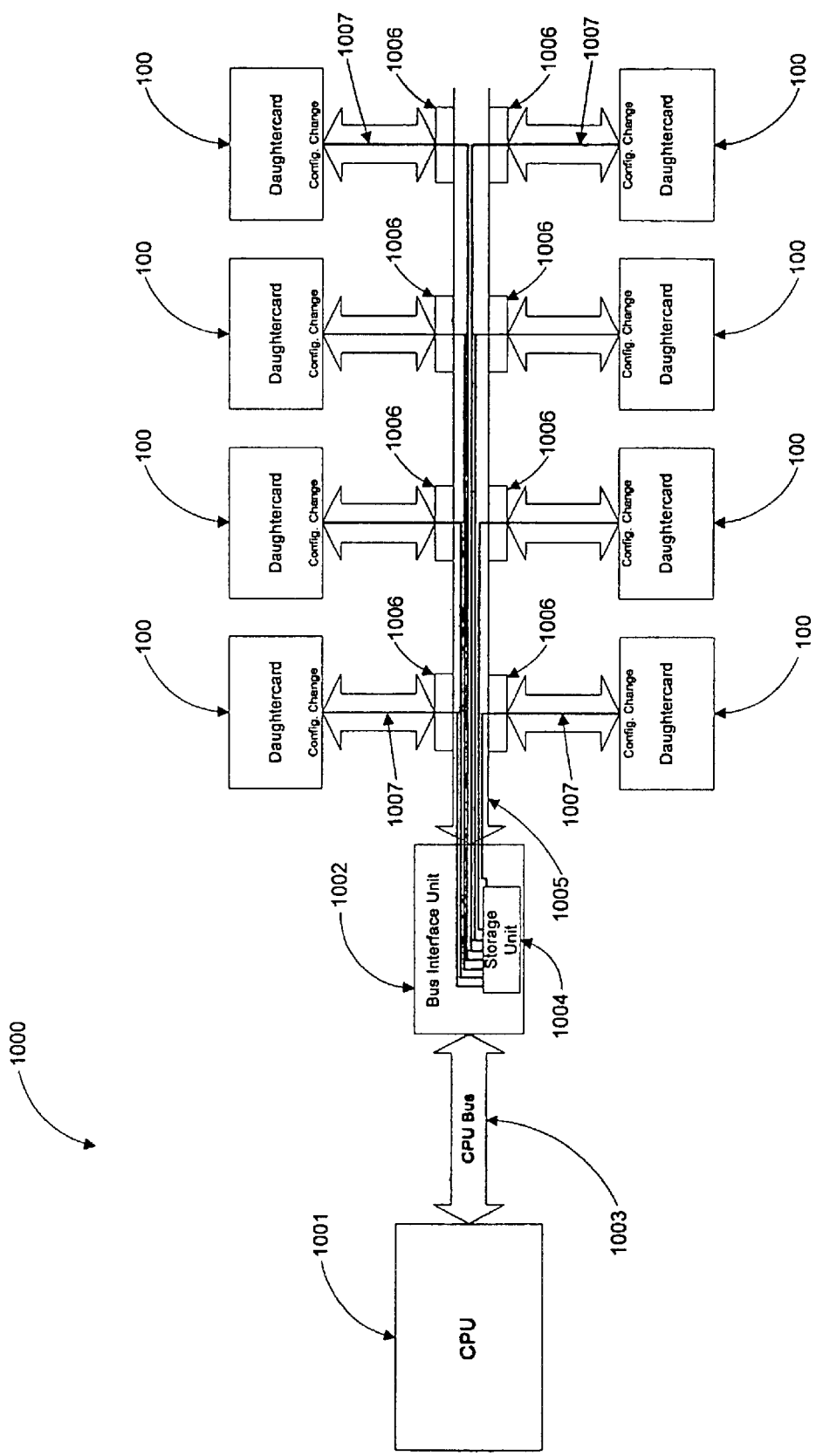
FIG. 2 is a block diagram of one embodiment of a computer system including separate configuration change signals for each daughtercard.

Turning now to FIG. 2, a block diagram of one embodiment of a computer system including separate configuration change signals for each daughtercard is shown. Computer system 1000 includes a central processing unit 1001 and a bus interface unit 1002 which are coupled by CPU bus 1003. Bus interface unit 1002 is also coupled to a peripheral bus 1005. In the embodiment shown, peripheral bus 1005 is a peripheral component interconnect (PCI) bus which conforms to the CompactPCI® Hotswap Specification. Other embodiments using other types of peripheral buses, such as an Industry Standard Architecture (ISA) bus are possible and contemplated. Connectors 1006 are associated with interface bus 1005. Each connector 1006 allows a daughtercard 100 to be coupled to interface bus 1005. Daughtercards 100 may be one of many different types of peripheral hardware. Examples of common daughtercards include network interface cards, process controller cards, and video graphics cards.

Each daughtercard 100 is configured to assert a configuration change signal. In the embodiment shown, configuration change signal is asserted as a logic low voltage. When asserted, the configuration change signal may be driven to a storage unit 1004 via signal paths 1007. A separate signal path 1007 for conveying a configuration change signal is provided for each daughtercard 100. Storage unit 1004, which is located within bus interface unit 1002, may be configured to store a state of the configuration change signal. Storage unit 1004 includes separate storage locations each corresponding to a daughtercard 100. CPU 1001 is configured to execute instructions that allow the state stored in each storage location to be periodically read from storage unit 1004. A logic low state detected in a given storage location may immediately allow CPU 1001 to determine which daughtercard 100 asserted a configuration change signal. If the daughtercard 100 asserting the configuration change signal has been freshly inserted into computer system 1000, CPU 1001 may execute additional instructions which establish software communications with the daughtercard. After CPU 1001 has successfully established software communications with daughtercard 100, computer system 1001 may then utilize the additional resources which it provides, and the configuration change signal may then be de-asserted.

A daughtercard 100 already present within computer system 1000, with software communications established, may also assert a configuration change signal, indicating that the daughtercard is to be extracted. When this occurs, CPU 1001 may execute instructions which cause a termination of software communications between daughtercard 100 and computer system 1000. Following the termination of software communications, daughtercard 100 may begin a power-down sequence. Daughtercard 100 may be safely extracted from computer system 1000 following completion of the power-down sequence.

It is noted that while bus interface unit 1002 is directly coupled to CPU 1001 via CPU bus 1003 in the embodiment described above, bus interface unit 1002 may be operatively coupled to CPU 1001 through multiple buses and/or interfaces in other embodiments.

Figure 3:
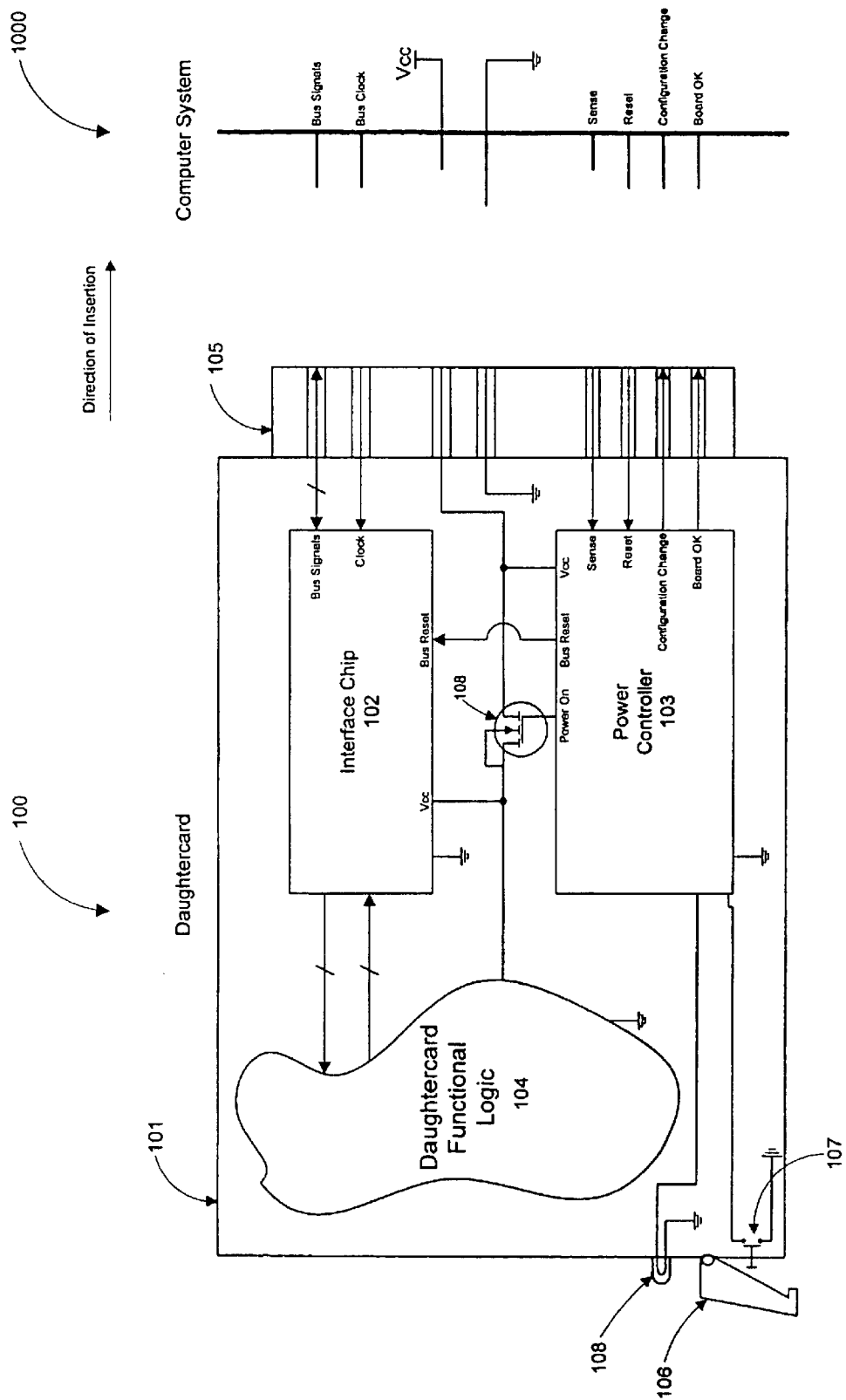
FIG. 3 is a block diagram of one embodiment of a daughtercard configured for hot swapping.

FIG. 3 is a block diagram of one embodiment of a daughtercard configured for hot swapping. Daughtercard 100 includes an interface chip 102, a power controller 103, and daughtercard functional logic 104 mounted upon printed circuit board (PCB) 101. Connector 105 is mounted to PCB 101, and is adapted to allow insertion of daughtercard 100 into computer system 1000. Daughtercard 100 also includes an ejector handle 106 and a switch 107.

Interface chip 102 provides a bridge between daughtercard functional logic 104 and a peripheral bus within computer system 1000. Interface chip 102 may transmit and receive bus signals associated with the peripheral bus from computer system 1000. Interface chip 102 may also receive a clock signal from computer system 1000. Daughtercard functional logic 104 may send signals to and receive signals from interface chip 102. In general, daughtercard functional logic 104 is circuitry which performs the primary function of the daughtercard. Daughtercard 100 may be one of many different is types of daughtercards.

Power controller 103 provides power circuitry which allows for the safe and orderly power-up of daughtercard 100 following insertion into the computer system. When daughtercard 100 is inserted into computer system 1000, power is received by power controller 103 through a power pin (denoted Vcc) of the computer system. A sense signal and a reset signal may also be received by the daughtercard from the computer system. When power controller 103 receives a sense signal from computer system 1000, it may begin powering up daughtercard 100. In the embodiment shown, power controller 103 may assert a Power On signal, which may then turn on power transistor 108. When activated, power transistor 108 allows system power to be provided to interface chip 102 and daughtercard functional logic 104. Other embodiments of various daughtercards may be powered up in a different manner.

Power controller 103 is also configured to receive a reset signal from computer system 1000. The reset signal may be asserted during the power-up sequence for daughtercard 100. Power controller 103 may respond to receiving the reset signal by driving a bus reset signal to interface chip 102. This may result in bus signals from interface chip 102 being in a reset state once interface chip 102 is receiving power, which may prevent daughtercard 100 from interacting with the peripheral bus.

When all circuitry of daughtercard 101 has successfully powered up, daughtercard 101 may then assert a board OK signal. In some embodiments, the board OK signal may be asserted once the daughtercard is powered up. In other embodiments, additional conditions (such as passing a built-in self-test) may be required for asserting the board OK signal. Computer system 1000 may respond to the assertion of the board OK signal by de-asserting the reset signal.

Following the de-assertion of the reset signal, power controller 103 may then respond by asserting the Configuration Change signal. When asserted by a freshly inserted daughtercard, the configuration change signal indicates to computer system 1000 that a new daughtercard is present and ready for initiation of software communications. In response to detecting the asserted Configuration Change signal, computer system 1000 may then begin establishing software communications with daughtercard 100. When computer system 1000 has successfully established software communications with daughtercard 100, the Configuration Change signal may be de-asserted.

Daughtercard 100 also includes an ejector handle 106 (some embodiments may have multiple ejector handles). In the embodiment shown, ejector handle 106 may be used to actuate switch 107. When actuated, switch 107 provides and indication to daughtercard 100 that it is about to be extracted from the connector of computer system 1000 into which it is coupled. Power controller 103 may respond to the actuation of switch 107 by asserting the Configuration Change signal. In this case, computer system 1000 may respond to the assertion of the Configuration Change signal by terminating software communications with daughtercard 100. In many cases, computer system 1000 will allow daughtercard 100 to complete any pending operations before terminating software communications. Once software communications have been terminated, computer system 1000 may assert the reset signal in order to prevent daughtercard 100 from interacting with the peripheral bus. Computer system 1000 may also de-assert the sense signal when software communications are terminated. Power controller 103 may then begin a power-down sequence, removing power from interface chip 102 and daughtercard functional logic 104. With software communications terminated and the power-down sequence completed, power controller 103 may then illuminate light-emitting diode (LED) 108. When illuminated, LED 108 indicates to a user that daughtercard 100 may be safely extracted from the computer system.

Figure 4A:
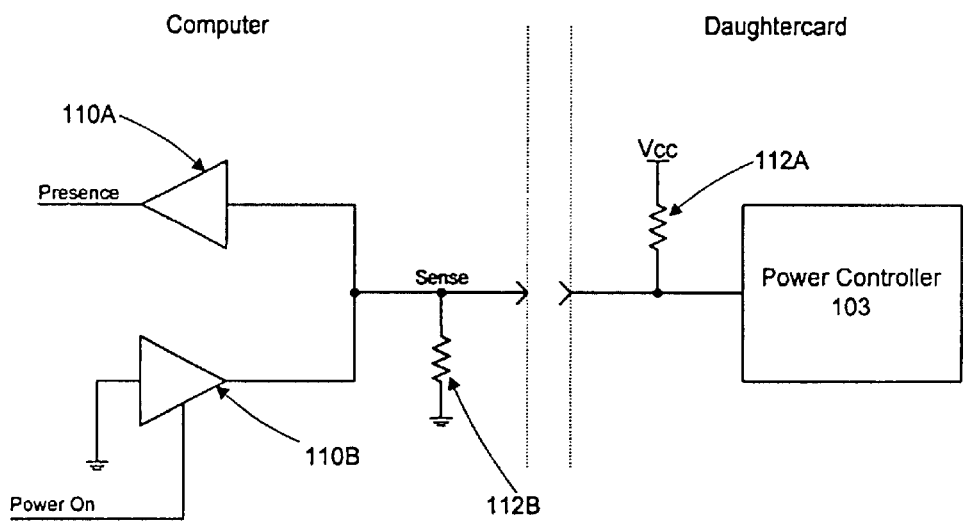
FIG. 4A is a schematic diagram illustrating the generation of the sense and presence signals used in one embodiment.

Moving now to FIG. 4A, a schematic diagram illustrating the generation of the sense and presence signals used in one embodiment is shown. The sense signal line in this embodiment is terminated by resistor 112B, which serves as a weak pull-down resistor, keeping the signal line at a logic-low voltage (near ground potential). When the daughtercard is inserted into the computer system, a strong pull-up resistor 112A overrides the weak pull-down resistor, and thus the sense signal is asserted as a logic-high voltage. The sense signal is then received by power controller 103 on the daughtercard, and by the input to amplifier 110A of the computer system. Amplifier 110A is configured to respond to the logic-high input by driving the presence detect signal to a logic-high on its output. The presence detect signal may then be used by the computer system to detect the presence of a freshly inserted daughtercard. In order to de-assert the sense signal when a daughtercard is connected, power is provided to amplifier 110B through the signal line labeled Power On (amplifier 110B is normally off, with no power applied). Since the input of amplifier 110B is connected to ground, the output of the amplifier (when operating) will be at or near ground potential. The sense signal may be deasserted in this manner when it is necessary to remove the daughtercard from the computer system.

Figure 4B:
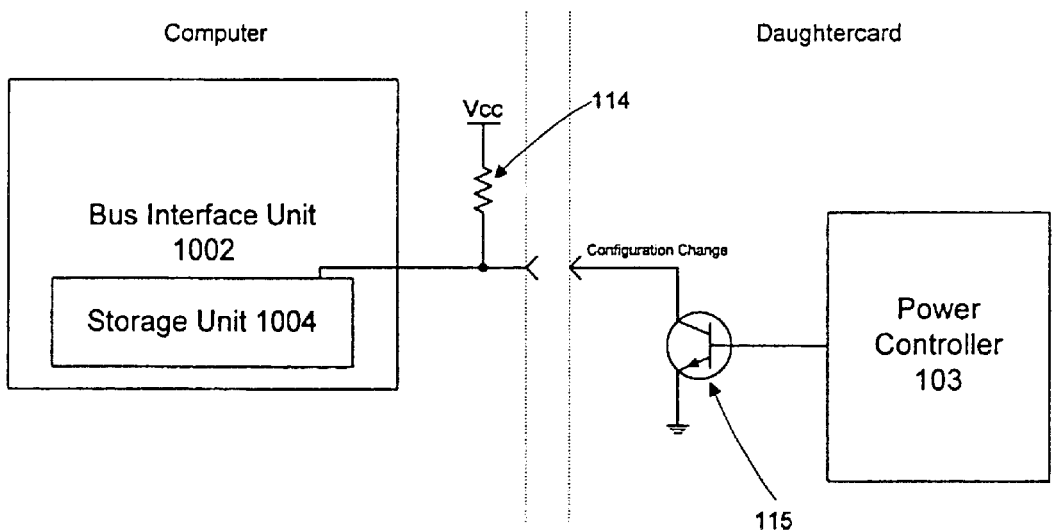
FIG. 4B is a schematic diagram illustrating the generation of the configuration change signal of one embodiment.

In FIG. 4B, a schematic diagram illustrating the generation of the configuration change signal of one embodiment is shown. When no daughtercard is connected, the input signal trace to storage unit 1004 is held at a logic-high voltage by pull-up resistor 114. When the daughtercard is connected, the logic-high state will remain as long as transistor 115 is turned off. Transistor 115, arranged in an open collector configuration, may be turned on by power controller 103. The configuration change signal may be asserted when power controller 103 turns on transistor 115. When transistor 115 is on, it may pull down the voltage present on the signal line to a logic-low voltage, overriding the pull-up resistor. Thus, the configuration change signal is asserted in a logic-low state in this embodiment. Storage unit 1004 may then store the logic-low state, thereby allowing the computer system to detect the assertion of the configuration change signal. A reading of a logic-low state from the storage unit may indicate to the computer system that a daughtercard has been recently inserted into a connector of the peripheral bus and is ready for establishment of software communications. A reading of a logic-low state may also indicate that a daughtercard is to be extracted from the computer system in cases where the daughtercard is present with software communications already established.

Figure 5:
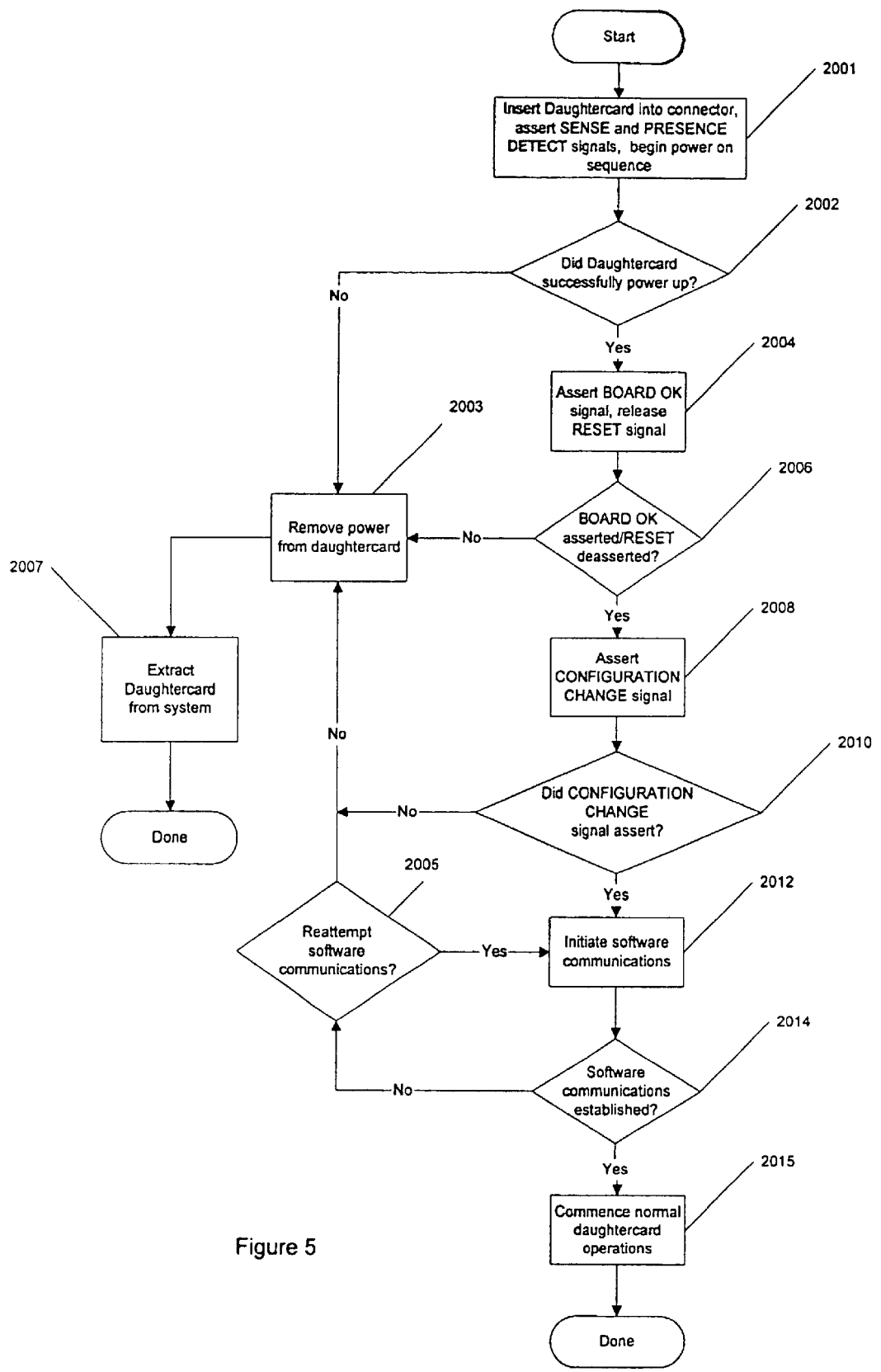
FIG. 5 is a flowchart illustrating a method of insertion of a daughtercard into an operating computer system for one embodiment.

Turning now to FIG. 5 a flowchart illustrating a method of insertion of a daughtercard into an operating computer system for one embodiment is shown. The method begins with step 2001, as a daughtercard is inserted into a computer system. Upon insertion of the daughtercard, sense and presence detect signals are asserted. The presence detect signal provides an indication to the computer system that a daughtercard has been freshly inserted into the system. The sense signal provides an indication to the daughtercard that its presence has been acknowledged by the computer system. After receiving the sense signal, a power controller on the daughtercard may then begin a power-up sequence. If, by step 2002, the daughtercard has successfully powered up, a board ok signal will be asserted by the daughtercard and the computer system will de-assert the reset signal, as in step 2004.

After verifying that the reset signal is de-asserted and the board ok signal is asserted (in step 2006), the daughtercard may then assert the configuration change signal in step 2008. The assertion of the configuration change signal is verified in step 2010. After the assertion of the configuration change signal, the computer system may respond by initializing software communications with the daughtercard. Establishing software communications may include such tasks as loading drivers into memory and allocating various system resources. After verifying that software communications have been fully established (step 2014), normal daughtercard operations may be commenced. At this point, the computer system may employ those resources provided by the daughtercard.

If, in step 2002, the daughtercard fails to fully complete its power-up sequence, the power controller on the daughtercard may respond by performing a power-down sequence in step 2003. Similarly, if the board ok signal is not asserted by the daughtercard, or the reset signal is not de-asserted by the computer system (step 2006), the power controller may begin performing the power-down sequence of step 2003. The power-down sequence of step 2003 may also be performed if the configuration change signal is not asserted by the daughtercard (step 2010).

If the initial attempt by the computer system to communicate with the daughtercard is unsuccessful (step 2014), the computer system may make further attempts at establishing software communications (step 2005). In some embodiments, subsequent attempts by the computer system to communicate with the daughtercard may occur automatically, while in other embodiments operator intervention may be required. If repeated attempts at communicating with the daughtercard fail, the power-down sequence may then be performed (step 2003). When the power-down sequence has completed, the daughtercard may then be physically extracted from the computer system (step 2007).

Figure 6:
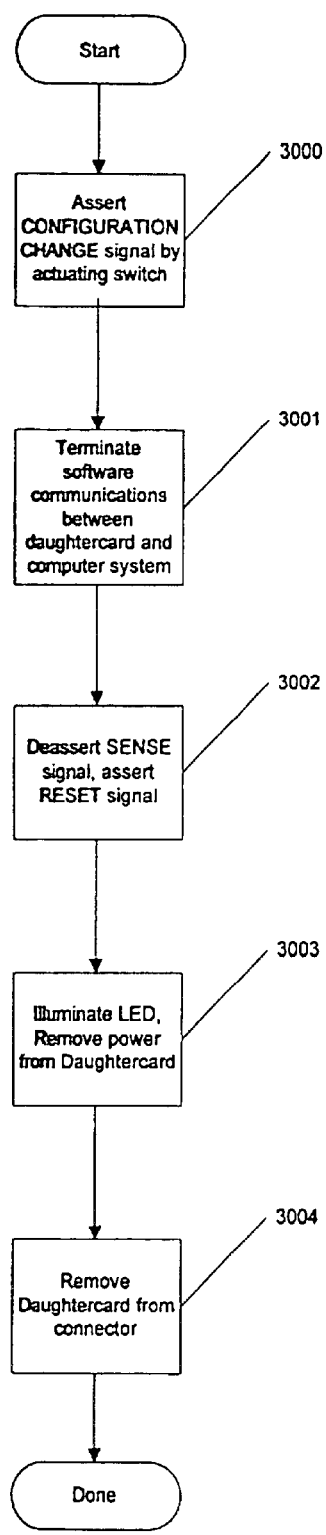
FIG. 6 is a flowchart of a method of extraction of a daughtercard from an operating computer system for one embodiment.

Moving now to FIG. 6, a flowchart of a method of extraction of a daughtercard from an operating computer system for one embodiment is shown. The extraction begins with the actuation of a switch on the daughtercard, which may cause the configuration change signal to be asserted (step 3000). By asserting the configuration change signal, the daughtercard provides an indication to the host computer system that it is to be extracted. The computer system may respond to the assertion of the configuration change signal by terminating software communications with the daughtercard (step 3001). In some cases, the computer system may allow for the completion of any pending operations involving the daughtercard to complete before terminating communications. When the computer system has terminated communications with the daughtercard, it may then de-assert the sense signal and assert the reset signal (step 3002). Asserting the reset signal may prevent any further interactions between the daughtercard and the peripheral bus. Next, the daughtercard begins its power-own sequence, removing power from the daughtercard (step 3003), and illuminates an LED on the daughtercard. When illuminated, the LED indicates to a user of the computer system that the daughtercard may be safely extracted from the computer system. In response, the user may remove the daughtercard from the connector into which it is asserted (step 3004).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:

a central processing unit (CPU);

a peripheral bus;

a bus interface unit coupled to accommodate communications between said CPU and said peripheral bus;

a first daughtercard configured to assert a first configuration change signal in response to said first daughtercard being inserted within a first connector associated with said peripheral bus;

a second daughtercard configured to assert a second configuration change signal in response to said second daughtercard being inserted within a second connector associated with said peripheral bus; and wherein said bus interface unit includes a storage unit including a first storage location for storing a state of said first configuration change signal and a second storage location for storing a state of said second configuration change signal, and wherein the first storage location is coupled to receive the first configuration change signal via a first signal line and the second storage location is coupled to receive the second configuration change signal over a second signal line that is separate from the first signal line.

2. The computer system as recited in claim 1, wherein said first configuration change signal has a first state and a second state.

3. The computer system as recited in claim 2, wherein said first state is a logic-low voltage.

4. The computer system as recited in claim 3, wherein said first state indicates that said first daughtercard has been recently inserted into said first connector.

5. The computer system as recited in claim 4, wherein said first state indicates that said first daughtercard is to be extracted from said first connector.

6. The computer system as recited in claim 1, wherein a state of said first configuration change signal is read from said storage unit on a periodic basis.

7. The computer system as recited in claim 1, wherein said peripheral bus is a peripheral component interconnect (PCI) bus.

8. The computer system as recited in claim 1, wherein said computer system is configured to drive a sense signal to said first daughtercard upon insertion of said first daughtercard into said first connector.

9. The computer system as recited in claim 8, wherein said computer system is configured to receive a presence detect signal upon insertion of said first daughtercard into said first connector.

10. The computer system as recited in claim 9, wherein said computer system is configured to drive a reset signal to said first daughtercard in response to receiving said presence detect signal.

11. The computer system as recited in claim 10, wherein said first daughtercard includes power control circuitry, wherein said power control circuitry is configured to perform a power-up sequence on said first daughtercard in response to receiving said sense signal from said computer system.

12. The computer system as recited in claim 11, wherein said first daughtercard is configured to drive a board ok signal to said computer system following completion of said power-up sequence.

13. The computer system as recited in claim 12, wherein said computer system is configured to de-assert said reset signal in response to receiving said board ok signal from said first daughtercard.

14. The computer system as recited in claim 13, wherein said first daughtercard is configured to assert said first configuration signal in response to said computer system de-asserting said reset signal.

15. The computer system as recited in claim 14, wherein said computer system is configured to establish software communications between said computer system and said first daughtercard in response to a detection of said first configuration change signal.

16. The computer system as recited in claim 15, wherein said first configuration change signal is deasserted upon establishing software communications between said computer system and said first daughtercard.

17. The computer system as recited in claim 1, wherein said first daughtercard includes at least one ejector handle.

18. The computer system as recited in claim 17, wherein said first daughtercard includes a switch configured to be actuated by said ejector handle.

19. The computer system as recited in claim 18, wherein said first configuration change signal is asserted in response to an actuation of said switch.

20. The computer system as recited in claim 19, wherein said computer system is configured to terminate software communications between said computer system and said first daughtercard in response to an assertion of said first configuration change signal.

21. The computer system as recited in claim 20, wherein said computer system is configured to de-assert a sense signal upon termination of software communications between said computer system and said first daughtercard.

22. The computer system as recited in claim 20, wherein said computer system is configured to drive a reset signal to said first daughtercard upon termination of software communications between said computer system and said first daughtercard.

23. The computer system as recited in claim 22, wherein said first daughtercard includes a light-emitting diode (LED).

24. The computer system as recited in claim 23, wherein said LED is illuminated in response to upon termination of software communications between said computer system and said first daughtercard.

25. The computer system as recited in claim 1, wherein said first daughtercard and said second daughtercard are configured for hot swapping.

26. A method for hot-swapping daughtercards in an operating computer system, the computer system comprising a central processing unit (CPU), a peripheral bus, and a bus interface unit including a storage unit, said bus interface unit configured to accommodate communications between said CPU and said peripheral bus, the method comprising:

inserting a first daughtercard into a first connector associated with said peripheral bus;

inserting a second daughtercard into a second connector associated with said peripheral bus;

asserting a first configuration change signal, said first configuration change signal asserted by said first daughtercard;

asserting a second configuration change signal, said second configuration change signal asserted by said second daughtercard;

storing a state of said first configuration change signal in a first storage location of said storage unit, wherein the first configuration change signal is received by the first storage location via a first signal line; and storing a state of said second configuration change signal in a second storage location of said storage unit, wherein the second configuration change signal is received by the second storage location via a second signal line, wherein the second signal line is separate from the first signal line.

27. The method as recited in claim 26, wherein said first configuration signal has a first state and a second state.

28. The method as recited in claim 27, wherein said first state is a logic-low voltage.

29. The method as recited in claim 28, wherein said first state indicates that said first daughtercard has been recently inserted into said first connector.

30. The method as recited in claim 28, wherein said first state indicates that said first daughtercard is to be extracted from said first connector.

31. The method as recited in claim 26, wherein a state of said first configuration change signal is read from said storage unit on a periodic basis.

32. The method as recited in claim 26, wherein said peripheral bus is a peripheral component interconnect (PCI) bus.

33. The method as recited in claim 26, wherein said computer system is configured to drive a sense signal to said first daughtercard upon insertion of said first daughtercard into said first connector.

34. The method as recited in claim 33, wherein said computer system is configured to receive a presence detect signal upon insertion of said first daughtercard into said first connector.

35. The method as recited in claim 34, wherein said computer system is configured to drive a reset signal to said first daughtercard in response to receiving said presence detect signal.

36. The method as recited in claim 35, wherein said first daughtercard includes power control circuitry, wherein said power control circuitry is configured to perform a power-up sequence on said first daughtercard in response to receiving said sense signal from said computer system.

37. The method as recited in claim 36, wherein said first daughtercard is configured to drive a board ok signal to said computer system following completion of said power-up sequence.

38. The method as recited in claim 37, wherein said computer system is configured to de-assert said reset signal in response to receiving said board ok signal from said first daughtercard.

39. The method as recited in claim 38, wherein said first daughtercard is configured to assert said first configuration change signal in response to said computer system de-asserting said reset signal.

40. The method as recited in claim 39, wherein said computer system is configured to establish software communications between said computer system and said first daughtercard in response to a detection of said first configuration change signal.

41. The method as recited in claim 40, wherein said first configuration change signal is de-asserted upon establishing software communications between said computer system and said first daughtercard.

42. The method as recited in claim 26, wherein said first configuration change signal is asserted in response to actuation of a switch mounted to said first daughtercard, wherein said switch is configured to be actuated by an ejector handle.

43. The method as recited in claim 42, wherein said computer system is configured to terminate software communications between said computer system and said first daughtercard in response to an assertion of said first configuration change signal.

44. The method as recited in claim 43, wherein said computer system is configured to de-assert a sense signal upon termination of software communications between said computer system and said first daughtercard.

45. The method as recited in claim 44, wherein said computer system is configured to drive a reset signal to said first daughtercard in response to termination of software communications between said computer system and said first daughtercard.

46. The method as recited in claim 44, wherein said first daughtercard is configured to illuminate a light-emitting diode (LED) in response to termination of software communications between said computer system and said first daughtercard.

* * * * *